3,326,965
PRODUCTION OF POLYESTERS
Heinz Schultheis, Cologne-Stammheim, Herbert Nordt and Claus Skopalik, Leverkusen, and Detlef Delfs, Opladen, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed Jan. 2, 1958, Ser. No. 706,538
Claims priority, application Germany, Dec. 14, 1954, F 16,366
2 Claims. (Cl. 260—475)

This invention relates generally to a method for making polyesters and, more particularly, to an improved method for making polyesters from a polycarboxylic acid and a polyhydric alcohol. This application is a continuation-in-part of our co-pending application Ser. No. 552,702, filed Dec. 13, 1955, now abandoned.

Various attempts have been made to shorten the esterification reaction by the addition of catalysts, such as sulfuric acid, p-toluenesulfonic acid, metal halides and complexes of organic acids with inorganic salts. But all these catalysts have proven to be unsuitable since they impart undesirable properties to the polyester obtained. Thus, the polyesters produced by esterification in the presence of the above-mentioned catalysts react with polyisocyanates to form polymeric compounds, such as varnishes and plastics, having unsatisfactory mechanical and electrical characteristics. In commercial operation, no catalysts have therefore been used, which entailed unreasonably long reaction times.

Co-pending application Ser. No. 439,876 now abandoned, filed June 28, 1954, and assigned to the same assignee as the present case, relates to a process for the production of polyesters from polybasic carboxylic acids and polyhydric alcohols, wherein divalent or trivalent cations of one or more of the metals copper, magnesium, zinc, cadmium, lead, antimony, manganese, iron and cobalt are used as esterification catalyst.

In the further investigation of the principle on which the process of the above-identified application is based, it has been found that of the metals referred to, iron is the one which most strongly accelerates the esterification process. The use of iron as esterification catalyst, however, has the disadvantage that more or less reddish to brownish-colored polyesters are obtained.

It has been discovered, however, that light-colored polyesters, very suitable for processing into plastics, are obtained with an esterification velocity at least in the order of magnitude produced by iron, if the esterification is carried out in the presence of a catalyst containing titanium or zirconium which is soluble in crystalloid or colloidal form in the reactive mixture.

Any catalyst containing titanium in the trivalent or tetravalent state or zirconium in the tetravalent state or mixtures thereof which is soluble in either crystalloid or colloidal form in the reaction mixture may be used to catalyze the esterification in accordance with this invention. Examples of suitable titanium catalysts include titanium tetrachloride, titanium dichloride diacetate, titanium salts of organic acids, such as, for example, titanium formate, titanium acetate, titanium adipate, titanium tartrate and the like, titanium acid esters, such as, for example, tetraethyl-ortho-titanate, halogenides, such as, for example, titanium tetrafluoride ($TiF_4$), titanium trichloride ($TiCl_3 \cdot 6H_2O$), titanium tetrabromide ($TiBr_4$), titanium tetrachloride ($TiCl_4$), titanium tetraiodide ($TiI_4$), titanium oxychloride [$TiO(ClO_4)_2 \cdot H_2O$], addition products of the halogenides, such as, for example, $TiCl_4 \cdot 2(C_2H_5)_2O$, $TiCl_4 \cdot C_6H_5NO_2$, and the addition product of titanium tetrachloride and 2 mols of quinoline, and the like, titanium thiocyanate, the titanium sulfates, such as, for example, $TiOSO_4$, $Ti(SO_4)_2$, $Ti_2(SO_4)_3 \cdot 6NH_3$, titanium alcoholates having the formula $$Ti(OR)_4$$

wherein R is an alkyl radical, such as, for example, methyl, ethyl, propyl, isopropyl, butyl or the like, phenolic compounds of titanium, such as, for example, tribrenzcatechin, titanium acid having the formula $H_2Ti(C_6H_4O_2)_3$. Similar zirconium compounds may be used, such as, for example, zirconium chloride, zirconium oxychloride, fluoro zirconium compounds having the formula $H_2ZrF_6$, zirconium alizarin complexes, zirconium alcoholates having the formula $$Zr(OR)_4$$

wherein R is an alkyl radical, such as, for example, methyl, ethyl, propyl, isopropyl, butyl or the like. It is to be understood that it is immaterial what compound of either titanium or zirconium is used in so long as the zirconium or titanium catalyst is dissolved in crystalloid or colloidal form in the reaction mixture. The invention thus contemplates broadly any process involving the acceleration of an esterification of a polycarboxylic acid with a polyhydric alcohol with any catalyst containing either titanium or zirconium. The invention also contemplates a process wherein one of the titanium or zirconium catalysts is mixed with other esterification catalysts, such as, for example, one of the metal cations disclosed in the aforesaid co-pending application.

In carrying out the process of the invention, the reactants, i.e., one or more polybasic carboxylic acids and one or more polyhydric alcohols, if desired, with addition of monobasic carboxylic acids and/or monohydric alcohols, are mixed in such proportions as to form a polyester of the desired characteristics. Thus, an hydroxyl polyester, which contains terminal hydroxyl groups, will be obtained if an excess of polyhydric alcohol is used, whereas a carboxyl polyester, which contains terminal carboxyl groups, will be formed when using an excess of polybasic carboxylic acid. To the mixture or to one of the components, there is added a minor amount of one or more of the titanium and/or zirconium compounds hereinbefore identified. It is preferred to employ the catalyst in an amount not exceeding 0.5% by weight, based on the weight of the mixture. The mixture containing the reactants and the catalyst is subjected to a terminal esterification wherein the reaction water is distilled off as it is formed. The esterification is preferably carried out at rising temperature, starting at about 120° C.–130° C. and ending at about 200° C.–230° C. In order to speed up the distillation of the reaction water, the last stage of the esterification is advantageously effected under reduced pressure and/or while introducing an inert gas into the reactive mixture. If desired, an entrainer, such as benzene, may be added in order to facilitate the removal of the reaction water. Any polycarboxylic acid and any polyhydric alcohol may be esterified in accordance with this invention.

The catalytic effect of titanium and zirconium compounds soluble in crystalloid or colloidal form in the reaction mixture was not to be foreseen because the insoluble oxides and hydroxides of these elements, even when added in large amounts, do not have an appreciable effect on the polyester formation, although they are very good catalysts for many other reactions, as shown, for example, by the great acceleration they bring about in the splitting up of glycol from terephthalic acid-bis-glycol esters to form terephthalic acid glycol polyesters.

The polyesters obtainable by the process of the instant invention are light in color and are particularly suitable for use in the production of polyurethane plastics.

Thus, hydroxyl polyesters obtained by esterification of at least one polybasic carboxylic acid, such as adipic acid or phthalic acid, with at least one polyhydric alcohol, such as ethylene glycol, diethylene glycol, the propylene glycols, the butylene glycols, hexanetriol or glycerol, in the presence of a catalytic amount of one of the herein disclosed titanium or zirconium compounds, using such proportions of the reactants as to produce polyesters having an acid number within the range of 0 to 15 and an hydroxyl number within the range of 20 to 500, may be reacted with polyisocyanates, such as hexamethylene diisocyanate, cyclohexane-1,4-diisocyanate, p-phenylene diisocyanate, toluylene-1,2,4- or 1,2,6-diisocyanate or napthylene-1,5-diisocyanate to produce valuable polyurethane rubbers, foams, lacquers, films and coatings. Polyurethane rubbers may be used for making vehicle tires, while polyurethane foams may be used for insulating, sponges, packaging or upholstery.

It is also possible to produce polyesters containing terminal carboxyl groups by the process of the invention. In this case a polyhydric alcohol is reacted with excess polybasic carboxylic acid in the presence of a catalytic amount of one of the herein disclosed titanium or zirconium compounds. Such carboxyl polyesters react with polyisocyanates in known manner to yield valuable plastics, such as foams, which contain ester and urea linkages.

The following examples serve to illustrate the invention without in any way limiting it:

*Example 1*

A mixture of 5540 grams of diethylene glycol, 440 g. of trimethylol propane and 7240 g. of ultra-pure adipic acid are heated to about 135° C. under a carbon dioxide atmosphere in a stirrer-type vessel made of $V_4A$ steel and having a capacity of 18 liters. The esterification of the three components starts at this temperature. It is initially carried out at ordinary pressure in 10 hours while gradually raising the temperature to exactly 200° C. and while distilling off about 1550 cc. of the water of esterification, the said distillation being effected through a Rasching column which is 30 cm. high.

At this time an acid value of 39.0 is determined in the reaction products. The esterification is now continued in vacuo, while maintaining the reaction temperature of 200° C., so that a vacuum of 15 mm. to 16 mm. is reached within 5 hours and is then maintained, the esterification velocity being followed by constant control of the acid value in the product. After a total esterification period of 24 hours, an acid number of 4.0 is reached in the polyester. After 32 hours, the esterification is terminated with an acid value of 1.5 and after also obtaining 170 to 175 cc. of distillate.

*Example 2*

If 5.3 grams of tetraethyl orthotitanate are added to the mixture of the three esterification components described in Example 1 and if this mixture is then esterified under the same conditions as indicated in Example 1, an acid value of 29.6 is measured after esterifying for 10 hours at ordinary pressure, while the acid value after a total esterification period of 17 hours is 4.0. The esterification is completed after a total of 18 hours and an acid value of 1.4 is reached.

*Example 3*

As described in Example 1, a mixture of diethylene glycol, trimethylol propane and adipic acid is esterified under the conditions indicated in said example, after adding 5.3 g. of titanium tetrachloride. An acid value of 29.2 is measured after 10 hours, while the acid number after 14½ hours is 4.0. The polyester obtained, which is substantially lighter as compared with that of Example 1, has an acid value of 1.3 after 16 hours.

This mixture therefore only involves half the esterification time required when not using an esterification accelerator as in Example 1.

*Example 4*

A mixture of diethylene glycol, trimethylol propane and adipic acid, as indicated in Example 1, is mixed with 2.8 g. of anhydrous zirconium tetrachloride and then esterified as indicated in Example 1. In observing the velocity of the esterification by determining the drop in the acid value, it is found that the acid value is 37.8 after 10 hours. The esterification is practically completed after 24 hours with an acid value of 1.30 being reached.

It is to be understood that any of the other catalysts stated herein to be operative may be substituted for the catalyst employed in the foregoing examples and that any other polycarboxylic acid and/or polyhydric alcohol may be substituted for those used in the foregoing examples.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. A method of producing polyesters by direct esterification of a compound selected from the group consisting of aliphatic and aromatic dicarboxylic acids with a member selected from the group consisting of a saturated dihydric alcohol and a saturated trihydric alcohol in the presence of a catalytic quantity of a member selected from the group consisting of titanium thiocyanate, a titanium sulfate, titanium oxyhalide and a compound having the formula $$MX_n$$

wherein M is titanium or zirconium, X is halogen and $n$ is 3 or 4.

2. A method of producing polyesters by direct esterification of a compound selected from the group consisting of aliphatic and aromatic dicarboxylic acids with a member selected from the group consisting of a saturated dihydric alcohol and a saturated trihydric alcohol in the presence of a catalytic quantity of titanium tetrachloride.

References Cited

UNITED STATES PATENTS 2,720,502  10/1955  Caldwell _____ 260—475 X
2,720,504  10/1955  Caldwell et al. _____ 260—475 X
2,727,881  12/1955  Caldwell et al. _____ 260—475 X LORRAINE A. WEINBERGER, *Primary Examiner.*

N. MARMELSTEIN, IRVING MARCUS, *Examiners.*

E. C. SPAETH, G. K. MILESTONE, T. L. GALLOWAY, *Assistant Examiners.*